No. 834,056. PATENTED OCT. 23, 1906.
E. W. HILDRETH.
GUARD FOR FISH LINES.
APPLICATION FILED JUNE 23, 1906.

WITNESSES:
Axel E. Ellis
William P. Richard

INVENTOR.
Eugene W. Hildreth
By his Attorney,
A. Hart Anderson

UNITED STATES PATENT OFFICE.

EUGENE W. HILDRETH, OF MELROSE, MASSACHUSETTS.

GUARD FOR FISH-LINES.

No. 834,056.	Specification of Letters Patent.	Patented Oct. 28, 1906.

Application filed June 23, 1906. Serial No. 323,017.

*To all whom it may concern:*

Be it known that I, EUGENE W. HILDRETH, a citizen of the United States, residing at Melrose, in the county of Middlesex and State of Massachusetts, have invented certain new and useful Improvements in Guards for Fish-Lines; and I do hereby declare the following to be a full, clear, and exact description of the invention, such as will enable others skilled in the art to which it appertains to make and use the same.

The present invention relates to fish-line guards designed to hold the hooked end of a fish-line while on the rod.

It is now the practice with anglers when a rod and line is prepared for use; but is temporarily laid aside without removing the fly or hook therefrom, to engage the hook with some part of the line, either by hooking it into the line on the reel or by wrapping the hooked end around the rod and engaging the hook with the running line. Also in those rods having cork handles the hook is sometimes inserted in the cork of the handle.

Many fishermen when starting for a day's sport carry several rods with them prepared for use, and much difficulty and annoyance has been experienced by the constant disengagement of the hooks from their temporary fastenings in the line or in the cork surface of the handle, resulting in the hooks flying around as the rods are handled, endangering the clothing and hands of the parties handling the rods and rendering them liable to become tangled with other lines and injuring the hooks or flies and the lines.

The object of the present invention is to provide a safety-guard for the use of anglers whereby the hooked end of the line may be securely held and prevented from becoming injured or from entanglement with other lines and hooks when the rod and line is temporarily out of use.

A further object of the invention is to provide a safety-guard for the hooked ends of lines while on the rods, which safety-guard may be readily attached to and removed from the rod.

To the above ends the present invention consists of the improved saftey-guard for fish-lines, which will be hereinafter described and claimed.

The present invention is illustrated in the accompanying drawings, in which—

Figure 1:
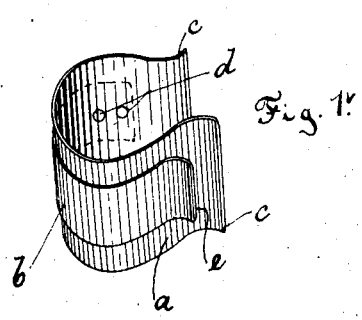
Figure 2:
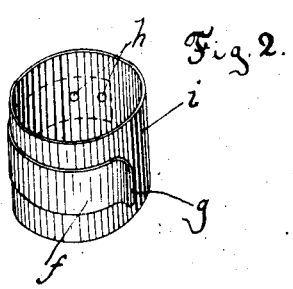
Figure 3:
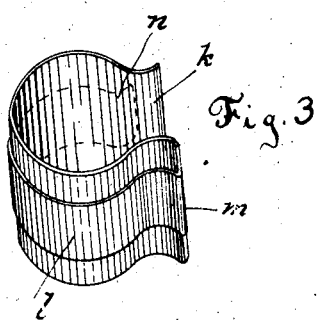
Figure 4:
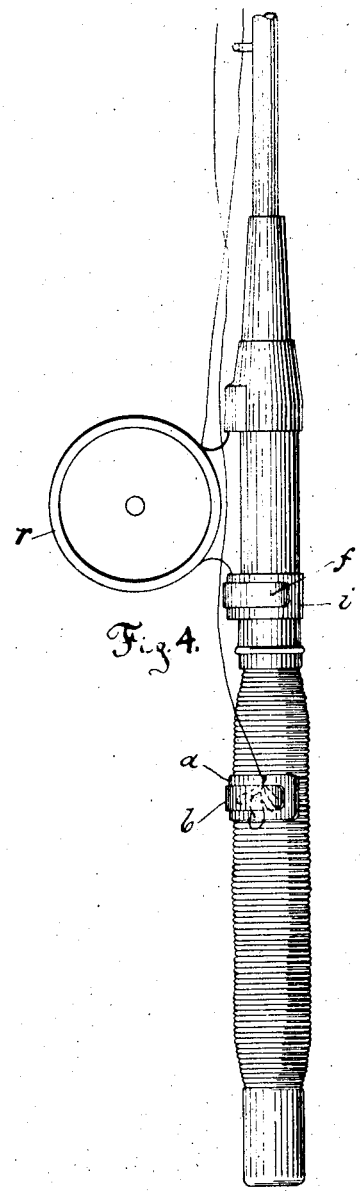

Figure 1 shows the preferred form of my improved safety-guard removed from the fish-rod. Fig. 2 shows a safety-guard as forming part of the movable retaining-ring of the fish-line reel. Fig. 3 shows a modification wherein the clip and spring-tongue are formed integrally. Fig. 4 shows a handle of a fish-rod, illustrating the use of my improved safety-guard and showing the application to the rod of the forms of the device shown in Figs. 1 and 2.

Similar reference characters will be employed throughout the specification and drawings to designate corresponding parts.

As shown in Fig. 1, my improved safety-guard consists of the spring-metal clip $a$ and the tongue $b$, also made of spring metal. The clip $a$ and tongue $b$ are curved, as shown clearly in Fig. 1, and the clip $a$ will be preferably bent outwardly at its free ends, as shown at $c$, to facilitate its application to the handle of the rod, as shown in Fig. 4. The tongue $b$ will be secured to the clip $a$ by the rivets $d$, and its free end will be outwardly bent, as indicated at $e$. The whole device is formed of spring metal and stamped up, as shown in Fig. 1, and the tongue $b$ will lie close to and follow the contour of the clip $a$.

In Fig. 2 the tongue $f$ is formed substantially as the tongue $b$ and has its free end upturned, as shown at $g$, and at its opposite end it is secured, by means of rivets $h$, to the ring or collar $i$, which ring or collar is the movable ring or collar usually mounted upon the handle of a fish-rod, as shown in Fig. 4, for securing the reel $r$ thereto.

In Fig. 3 the clip $k$ and the tongue $l$ are formed integrally, they being united at the bend $m$, from which point the tongue $l$ extends around the clip $k$, as shown in dotted lines, and has its free end bent outwardly, as shown at $n$.

In use the device shown in Figs. 1 and 3 may be sprung over the handle of the fish-rod, as shown clearly in Fig. 4, and the hooked end of the line will be passed under the tongue $b$ or $l$, as the case may be, where it will be firmly held between the smooth parallel gripping-faces of the tongue and clip. If the form shown in Fig. 2 be used, the hooked end of the line will be passed under the tongue $f$ in the same manner.

Of course it will be understood that while in Fig. 4 the forms shown in Figs. 1 and 2 are both shown, only one will be used, this view being merely a diagrammatic view illustrating the use of both forms.

If a fly be used, it will be spread out and passed under the spring-tongue, which acts to press and hold it in shape while drying.

Having described my invention, I claim as new and desire to protect by Letters Patent of the United States—

1. A guard for the hooked end of fish-lines consisting of a spring-clip for detachably engaging the fish-rod and provided with a spring-tongue attached at one of its ends to the outer side of the clip, substantially as described.

2. A guard for the hooked end of fish-lines consisting of a curved spring-clip for detachably engaging the fish-rod and provided upon its outer surface with a curved spring-tongue, substantially as described.

In testimony whereof I affix my signature in presence of two witnesses.

EUGENE W. HILDRETH.

Witnesses:
T. HART ANDERSON,
MAY A. KENNEY.